United States Patent [19]

Henderson

[11] Patent Number: 4,751,715
[45] Date of Patent: Jun. 14, 1988

[54] CLUSTERED WAVEGUIDE LASER

[75] Inventor: Alan R. Henderson, Carlsbad, Calif.

[73] Assignee: Hughes Aircraft Company, Los Angeles, Calif.

[21] Appl. No.: 913,829

[22] Filed: Sep. 30, 1986

[51] Int. Cl.$^4$ .................... H01S 3/05; H01S 3/096
[52] U.S. Cl. ........................... 372/64; 372/82; 372/87; 372/97
[58] Field of Search ................ 372/97, 64, 87, 82

[56] References Cited

U.S. PATENT DOCUMENTS

| | | | |
|---|---|---|---|
| 3,970,963 | 7/1976 | Chester | 372/64 |
| 4,103,255 | 7/1978 | Schlossberg | 372/64 |
| 4,129,836 | 12/1978 | Papayoanou | 372/64 |
| 4,169,251 | 9/1979 | Laakmann | 372/64 |
| 4,241,319 | 12/1980 | Papayoanou | 372/64 |
| 4,367,554 | 1/1983 | Schlossberg | 372/64 |
| 4,429,398 | 1/1984 | Chenausky et al. | 372/64 |
| 4,438,514 | 3/1984 | Chenausky et al. | 372/64 |
| 4,464,758 | 8/1984 | Chenausky et al. | 372/64 |
| 4,577,323 | 3/1986 | Newman et al. | 372/64 |
| 4,633,478 | 12/1986 | Robusto | 372/92 |
| 4,703,489 | 10/1987 | Ross | 372/64 |

FOREIGN PATENT DOCUMENTS 0121313 10/1984 European Pat. Off. .

OTHER PUBLICATIONS

Japanese Patent Abstract, vol. 7, No. 276 (E-215) (1421), Dec. 9, 1983; and 58-157186, Sep. 19, 1983; Takasu.

Primary Examiner—James W. Davie
Assistant Examiner—Xuan T. Vo
Attorney, Agent, or Firm—Joseph E. Szabo; Anthony W. Karambelas

[57] ABSTRACT

A multiple cavity waveguide laser is formed of a pair of face to face contiguous dielectric blocks 70, 72, in the facing surfaces of which are formed pairs of mating waveguide grooves 78, 80, 82, 84, having an electrode partition 92 sealed to and between the adjacent mating blocks to separate one pair of waveguide cavities from another, thereby forming four closely spaced waveguide cavities. In another embodiment, the partition 26 between the two dielectric blocks 10, 12 is thin conductive material, and dielectric partitions 36, 38 are provided between cavities of each pair in a single dielectric block. The internal surfaces 40, 42, 44, 47 of each cavity opposite the common electrode 26 are plated with an electrically conductive material, and suitable electrical connections 56, 58, 18 are made from the internal electrodes to the exterior of the blocks. The two blocks 10, 12 are fixed to one another by a brazing and sealing compound 18 on their surfaces, which brazing compound may form part of the electrical connection from the internal electrodes. Mirrors common to all four cavities are mounted to the ends 62, 64 of the blocks, and radio frequency energy is coupled to the internal electrodes for excitation of the lasing gas within the cavities.

14 Claims, 4 Drawing Sheets

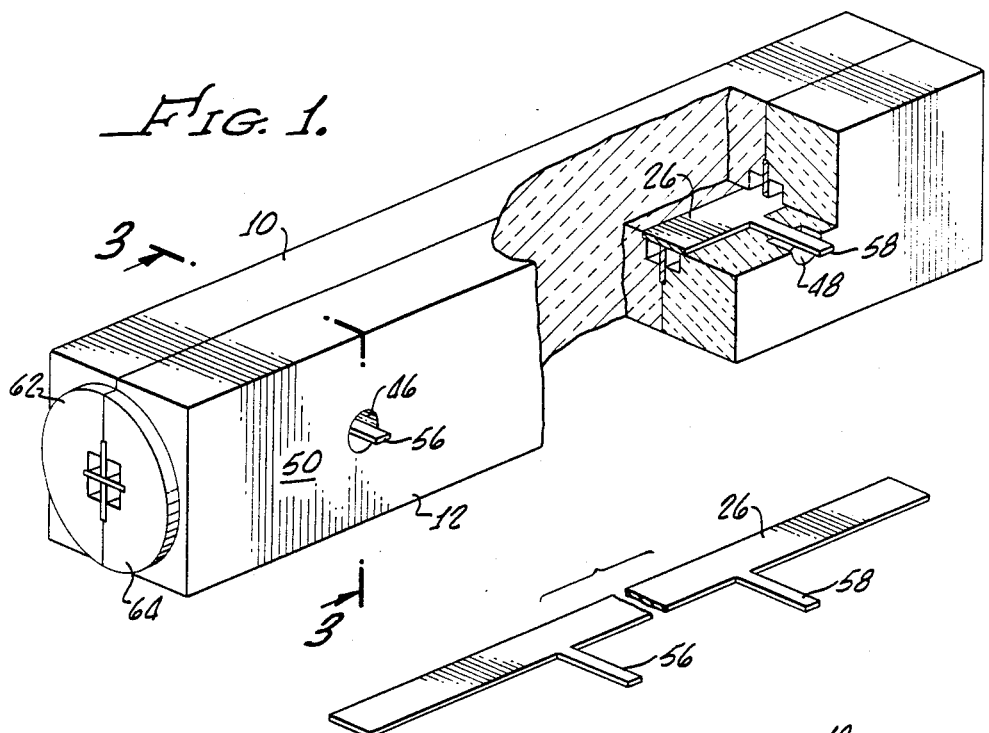
FIG. 1.
FIG. 2.
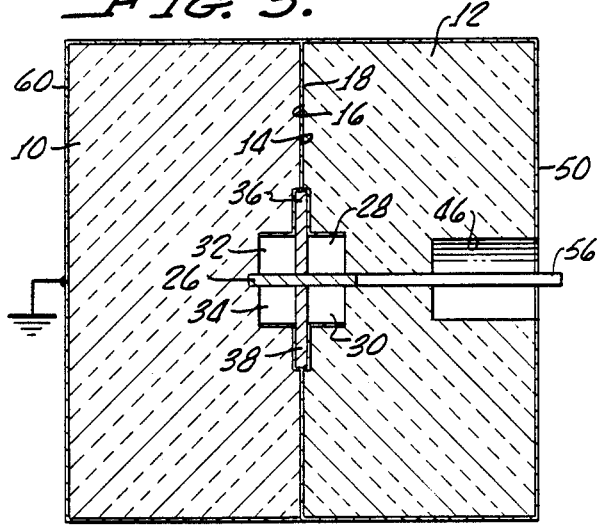
FIG. 3.
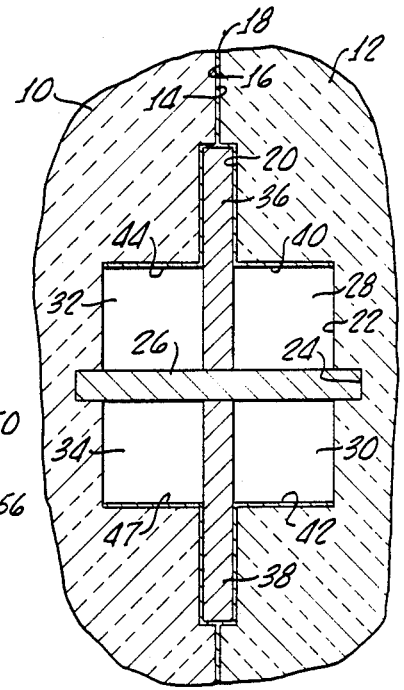
FIG. 4.

CLUSTERED WAVEGUIDE LASER

BACKGROUND OF THE INVENTION

1. Field of the Invention

This invention relates to lasers, and more particularly concerns design of an improved waveguide laser having multiple cavities.

2. Description of Related Art

An important goal in the development and design of working lasers is achievement of a small size, high power and lightweight laser system. Compact, high power lasers have many possible fields of application, including communication, manufacturing, and medicine. Particularly in the fields of medicine and communication, light, small and high power instruments are desired.

The conventional gas laser, although producing a suitably high power output, fails to lend itself to sufficiently compact and lightweight designs for many applications. Waveguide gas lasers have been developed in an attempt to overcome existing problems of prior gas lasers. The waveguide gas laser incorporates a resonator in which radiation is transmitted in part by guided wave propagation, which is in contrast to the conventional laser where feedback and resonator modes are established by normal free space propagation. Advantages of most waveguide laser systems as compared to conventional lasers include reduced laser size, use of flat, instead of curved mirrors, smaller transverse dimensions, high laser gain and pressure broadened lasers. The waveguide laser has potential for compact, low power lasers otherwise not possible. Other advantages include high pressure operation resulting in increased frequency tunability in lasers such as carbon dioxide systems, efficient matching between the optical resonating and laser excitation means, and excellent mode control through the unique properties of waveguide laser resonators.

Examples of waveguide gas lasers are disclosed in the following U.S. patents: U.S. Pat. Nos. 4,577,323 to Newmann et al, 4,103,255 to Schlossberg, 4,464,758 to Chenausky et al, 4,429,398 to Chenausky et al, 4,169,251 to Laakmann, and 4,129,836 to Papayoanou.

Various techniques for constructing waveguide cavities of prior art waveguide gas lasers exhibit problems in the scaling of cavities and the coupling of the exciting energy to the cavities. Where the waveguides are formed in a plurality of ceramic blocks, solder or epoxy has been used for securing and sealing the blocks to one another. However, such techniques employ materials that may give off gases which contaminate the lasing medium and may lack desired temperature stability and sealing characteristics. Significant problems exist in providing exciting electrodes. Direct current excitation of such waveguide gas lasers has required a relatively large DC excitation between a pair of electrodes positioned near respective ends of a relatively long laser waveguide cavity. Such an arrangement requires large voltages, power supplies and circuitry capable of handling such voltages. To avoid problems with direct current excitation, radio frequency excitation has been suggested, but again introducing the difficulty of providing excitation along the entire length of the waveguide cavities. For example, as shown in the patent to Laakmann, U.S. Pat. No. 4,169,251, a single waveguide cavity is formed between a pair of mutually spaced dielectric blocks, between which are interposed a pair of mutually spaced solid electrodes which extend laterally outwardly beyond the sides of the dielectric blocks. Construction, size and configuration of such an arrangement is limited by the necessity of providing such interposed electrodes. Moreover, the arrangement is not adapted to provide a compact, lightweight laser having multiple cavities.

Accordingly, it is an object of the present invention to provide a multiple cavity waveguide which avoids or minimizes problems mentioned above.

SUMMARY OF THE INVENTION

In carrying out principles of the present invention in accordance with a preferred embodiment thereof, a multiple cavity waveguide laser is formed of first and second blocks of dielectric material having mutually contiguous faces sealed to one another. First and second pairs of waveguide grooves formed in the blocks have the grooves of each pair separated by a thin partition, and have the pairs of grooves of the respective blocks also separated by a thin partition. One of the partitions is electrically conductive, forming a first full length electrode for all of the grooves, which define waveguide cavities. According to a feature of the invention, radio frequency energy is coupled to the electrode and to additional oppositely disposed internal electrodes by means of a conductive tab or metallization extending through holes in the dielectric blocks.

Another feature of the invention involves the use of an electrically conductive brazing compound to secure and seal the dielectric blocks to one another, such brazing compound extending from the interior cavities to the exterior of the dielectric blocks, thereby forming an electrically conductive path for application of radio frequency energy to the internal electrodes.

BRIEF DESCRIPTION OF THE DRAWINGS

In the accompanying drawings:

FIG. 1 is a perspective view, with parts cut away, of a multiple cavity waveguide gas laser embodying principles of the present invention.

FIG. 2 illustrates the common electrode of FIG. 1.

FIG. 3 is a section taken on lines 3—3 of FIG. 1.

FIG. 4 is an enlarged fragmentary view of FIG. 3.

DESCRIPTION OF THE PREFERRED EMBODIMENTS

Figure 5:
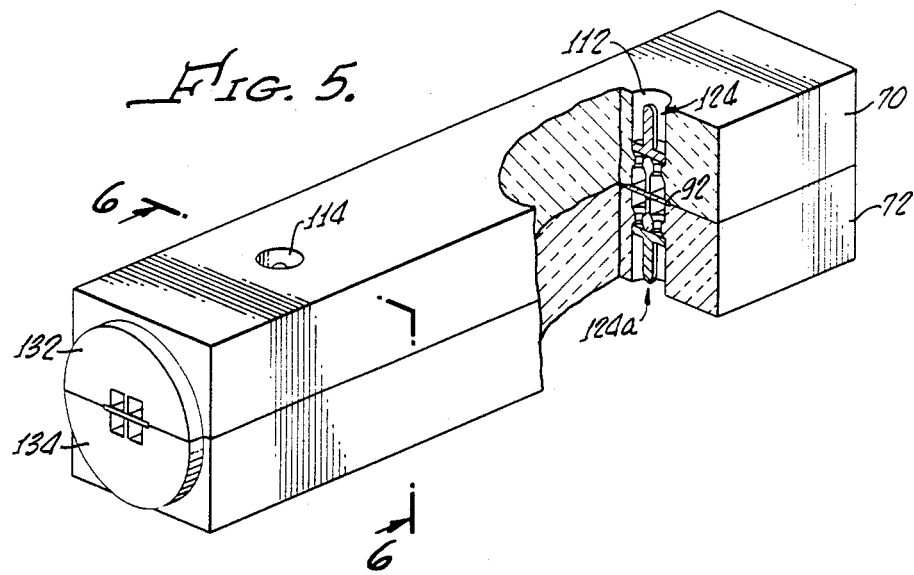
FIG. 5 is a perspective view with parts cut away of a second embodiment of the invention.

As illustrated in FIGS. 1 through 4, first and second relatively long, rectangular cross-section ceramic blocks 10, 12 made of beryllia or aluminia, or other comparable material having very low coefficient of thermal expansion, and having good electrical insulating properties, are joined in face-to-face relation along contiguous facing surfaces 14,16, with a brazing compound 18 coating all mutually contiguous areas of the mating surfaces so as to fixedly secure and seal the blocks to one another. Except for electrode connector holes, to be described below, the two blocks are virtually identical. Thus, a description of one will suffice to provide a description of both. Each block, such as block 12, is formed with a shallow partition receiving recess 20 (FIG. 4) in its surface 16, with a cavity recess 22 extending more deeply into the block from the partition receiving recess 20. At an innermost central position of the cavity recess 22 is a cross partition receiving recess 24 receiving an edge portion of a thin common electrode partition 26 (see also FIG. 2) that extends centrally across the cavities 22 and recesses 20 of both mating blocks to divide the cavity recesses of each block into first and second waveguide cavities 28, 30 for block 12 and waveguide cavities 32, 34 for block 10. Partition 26 is formed of electrically conductive material and provides a common electrode for all four of the waveguide cavities 28, 30, 32 and 34. The partition extends the full length of each of the dielectric blocks.

Within mating halves of the partition receiving recesses 20, on either side of common electrode partition 26, are positioned thin ceramic (dielectric) strips 36, 38 extending longitudinally for the full length of the blocks, and each extending transversely from an end of recess 20 to close, tight-fitting abutment against one side of the partition electrode 26.

The brazing compound 18, which fixedly interconnects and seals the contiguous surfaces 14, 16, is interposed between the ceramic blocks and both sides of ceramic partition strips 36, 38, extending continuously along the sides and ends of the thin partition strips from the cavities to the junction faces 14, 16. Thus the two blocks, when joined as illustrated and described, with the interposed partitions therein, define a cluster of four very closely spaced, symmetrically positioned and arranged elongated waveguide cavities, each of which has one side thereof formed by a surface of the partition electrode 26, which separates the cavities of the pair 32, 34 in block 10 from each other and which also separates the cavities of the pair 28, 30 in block 12 from one another. The partition strips 36, 38 collectively separate the pair of cavities 32, 34 from the pair of cavities 28, 30, to provide separate, mutually independent waveguide cavities which are immediately adjacent to one another, symmetrically disposed, and yet separated from one another by the partition means. The surface of each waveguide cavity that is opposite the electrode 26, such as surfaces 40, 42, 44, and 47, are coated with electrically conductive material which forms, for each cavity, a second electrode running the full length of the cavity. Accordingly, each cavity has a pair of mutually spaced first and second totally internal electrodes running the full length of the cavity on opposite sides of the cavity.

In order to provide radio frequency exciting energy to the electrodes, a plurality of feed holes, such as apertures 46, 48 (FIG. 1) are formed in one of the blocks, such as block 12, at spaced points along the block. The electrode feed holes 46, 48 extend from the outer surface 50 of block 12, partly through the block to holes which extend to the cavities and are configured to closely fit and receive conductive tabs, such as tabs 56, 58. The latter are integral with or otherwise fixedly connected to one side edge of the common electrode 26. The tab holes are metallized and brazed to seal tabs 56, 58 to the cavities. Block 10 has neither feed holes nor tabs. The common electrode 26 and its conductive tabs 56, 58 may be formed as an integral or unitary assembly as shown in FIG. 2, with the conductive tabs 56, 58 inserted into the feed holes and tab holes of block 12 just prior to assembly of this block with the other.

The entire exterior of the joined blocks 10, 12 is coated with the metallizing compound 60 electrically coupled with the interconnecting brazing coating 18, with this external coating 60 covering the entire exterior of the combined blocks except for areas in and about the apertures 46, 48 and the semicircular end faces of blocks 10 and 12.

Each dielectric block has one half of a pair of mating semicircular or half-disc shaped elements 62, 64 integrally formed on an end thereof with the two disc elements in face-to-face abutment to form a complete circular disc. The brazing compound, the electrode 26, and the thin ceramic partition strips 36, 38, all extend through the entire length of the blocks from end to end and from one of the discs to the other. It will be understood that both ends of the assembled blocks are the same in that each has an identical set of semicircular discs. These disc halves collectively form a circular mounting for a mirror so that, as described below and illustrated in FIG. 8, a mirror may be mounted at each end of the waveguide cavities to provide the multiple internal longitudinal reflections required for lasing action. One of the mirrors is made partially transmissive to provide an output beam. The close proximity of all four of the waveguide cavities to one another enables a single mirror on each end mirror mount to be employed in common for all four of the cavities. Accordingly, a single angular adjustment of the mirror as is necessary for achieving optimum operation will effectively adjust reflection and operation for all four of the cavities.

Radio frequency energy, having a frequency in the order of about 100 megahertz, is coupled to all four cavities substantially along the entire length of each of the cavities by providing a power radio frequency connection to the several power electrode tabs 56, 58 and by connecting the external shielding coating 60 to ground, as shown schematically in FIG. 3. The external shielding coating 60 is continuous over the length and around the perimeter of the assembly of brazed blocks. It is also continuous (in electrically conductive contact) with the brazing between the blocks, and thus is electrically connected to the continuous internal coating electrodes 40, 42, 44, and 47.

With the described arrangement, each laser cavity has two sides formed directly by the dielectric block, which provides good heat transfer to the exterior. The high temperature brazing operation employed to metallize the blocks provides a true hermetic seal which is greatly superior to any seal provided by an epoxied or soldered joint.

By providing a closely grouped set of independent laser waveguide cavities, a power output comparable to a laser that has a length several times greater than that of the clustered group is provided. Because of the close proximity of the four laser cavities, the four independent and separate laser beams may be readily combined at a very short distance from the output mirror, thereby providing a single beam of greater cross section and significantly greater power with a much shorter laser length. Moreover, because the total power is distributed over the area of the four beams, the intensity of energy per unit area impinging upon the mirrors is greatly decreased, thereby improving mirror life and operation. As a further advantage, by using the close compact arrangement of four cavities, each can have a very small diameter so that single mode operation may be retained, and the multi-mode operation attendant upon a larger waveguide size is avoided.

Higher gas pressure within a laser increases the length of its life and provides a broader bandwith, which are features desirable for many applications. However, because higher pressure requires smaller diameter waveguides and the described arrangement provides a system in which a number of such small diameter waveguides may be provided in a closely clustered group, there is effectively provided the equivalent of a single large diameter laser of much longer length. Moreover, it is possible, with the described arrangement, to provide some degree of mode coupling among the several closely spaced beams as they exit the laser through the forward, partially reflective, mirror. If such mirror is spaced by even a very slight distance from the end of the cavity, there can be a small amount of optical coupling at the cavity ends due to the diffraction of light at the end of the waveguide. Thus, some light from one cavity may be reflected or diffracted and deflected into another, setting up a weak feedback path. This feedback tends to couple the cavities together so as to superimpose a single frequency or a single mode upon all. Another advantage of the very close positioning of the several laser cavities is that it provides for a greater uniformity of temperature among the cavities of the group. In other words, the closer that the cavities are to one another, the less likely any significant temperature difference from one to the other. Thus, thermal changes, that is thermally induced expansions and contractions which tend to change modes, will tend to be the same in all of the cavities, and thus provide and maintain the same effective lengths of all.

From examination of the geometry involved, it will be seen that the effects of a mirror that is oriented out of a plane precisely perpendicular to the cavity axes, so that the two end mirrors are not precisely parallel to one another, will provide a considerably decreased path length difference from one cavity to the other, because of the close proximity of the several cavities. For example, consider a mirror that has its surface at some angle other than 90° to the axis of the waveguide cavity. In such a situation, one portion of the surface of the mirror adjacent to a first one of the cavities will be relatively close to the cavity end, whereas an adjacent portion of the mirror surface operating on the energy beam within an adjoining cavity may be spaced somewhat further from the end of the cavity because of the tilt of the mirror. This changes the relative path lengths of the two cavities and tends to cause the two to operate in different modes. With adjacent waveguide laser cavities very close to one another, this path length difference due to misalignment of the mirrors is considerably decreased.

The external metallization surrounding the entire waveguide assembly provides a radio frequency shield to prevent radiation of the exciting RF energy that is applied to the electrodes.

The energizing frequency, preferably about 100 megahertz, may be within the range of 40 to 150 megahertz. At lower frequencies, fewer electrode feed tabs, such as 56, 58, need be employed along the length of the dielectric blocks. In general, no point along the length of electrode 26 should be more than about 5 percent of the radio frequency wavelength away from the feed point. In some configurations it may be desirable to make the common electrode 26 discontinuous, providing a small break, in the order of a few thousandth of an inch. Such a break should be kept small to avoid undesired interaction between adjacent waveguides and to avoid energy loss. On the other hand, such a short break will assist in coupling the energy of one of the clustered waveguides to the other by diffraction of light waves around the ends of the electrode at breaks in the electrode, if such coupling is desired. The shorter the length of the break the less the amount of energy coupled between adjacent cavities. In some instances where a relatively long system of clustered waveguides is employed, discontinuities in the common electrode 26 may be desired, even at the loss of laser efficiency, in order to increase the efficiency of the applied radio frequency drive.

Figure 6:
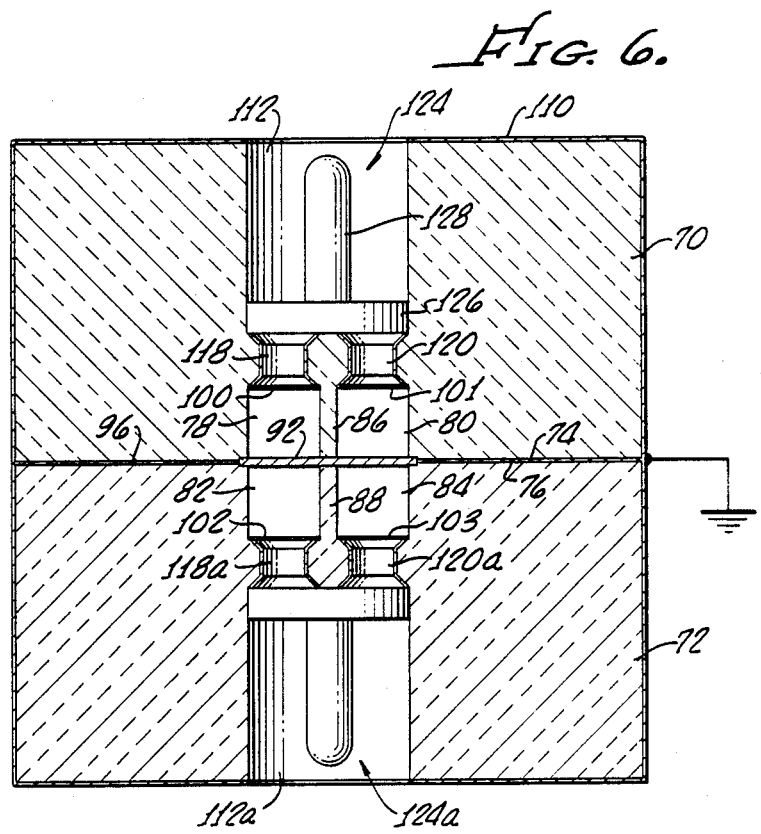
FIG. 6 is a section taken on lines 6—6 of FIG. 5.
Figure 7:
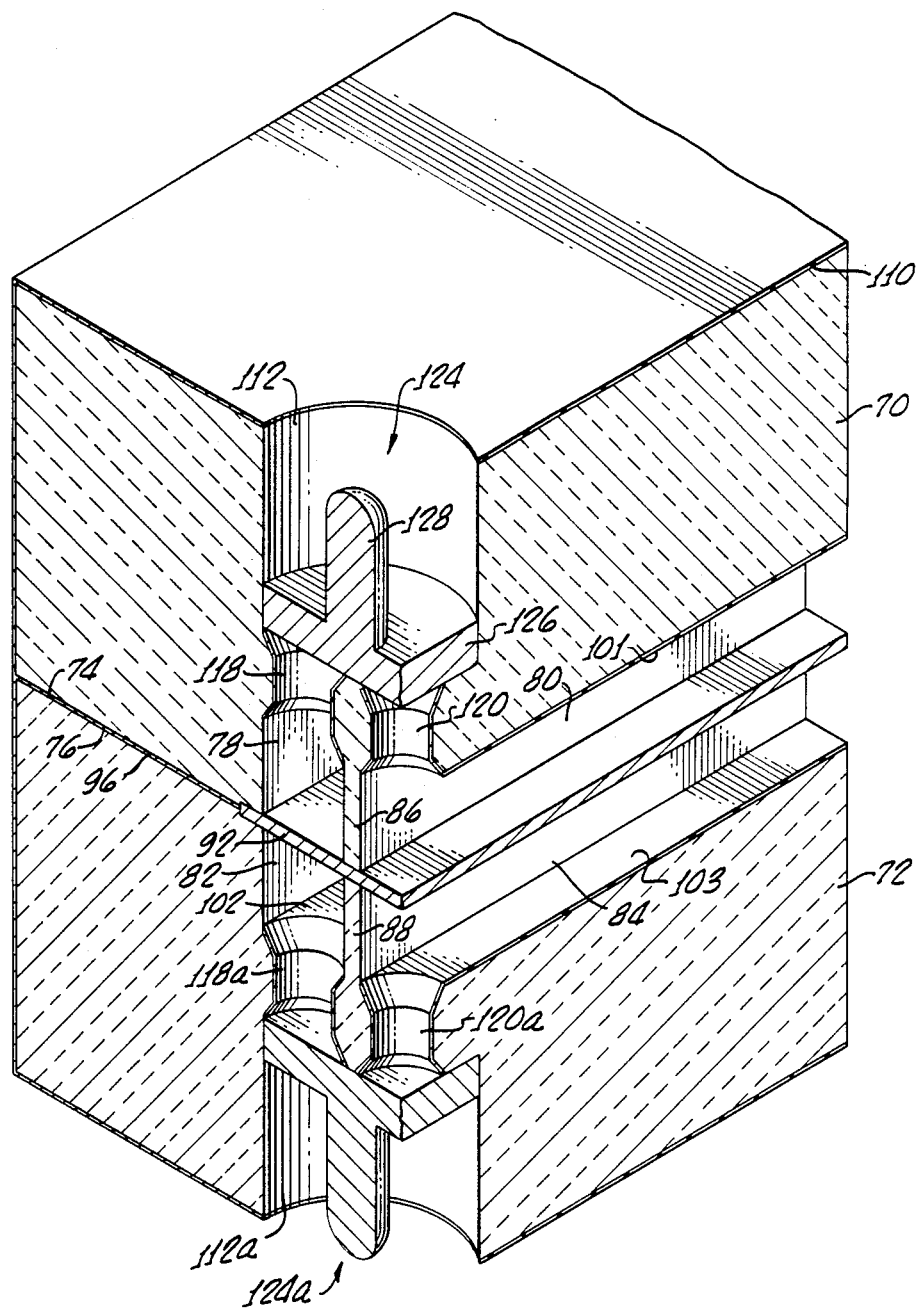
FIG. 7 is an enlarged section, with parts cut away, showing details of electrode construction of FIG. 5.

Illustrated in FIGS. 5 through 7 is a modification of the clustered waveguide laser of FIGS. 1 through 4, wherein first and second substantially rectangular section elongated dielectric blocks 70, 72 of a beryllia or aluminia or the like, are formed with mutually contiguous faces 74, 76. Each block has a pair of waveguide cavity grooves 78, 80, and 82, 84 formed therein of generally rectangular cross section and extending for the entire length of the dielectric block. The cavities of each pair are separated by longitudinally extending thin partitions 86, 88, which form an integral part of the ceramic or dielectric blocks.

A thin sheet of electrically conductive material 92, such as copper or the like, extends the length of the blocks, being interposed between the two at the contiguous surfaces 74, 76 and extending laterally outward from the cavities by a small amount. Partition receiving recesses are ground into the contiguous faces of the blocks 70, 72 to receive the common electrode formed by material 92. The contiguous surfaces 74, 76 are coated throughout their mating surfaces with electrically conductive connecting compound 96, such as the brazing compound previously described. The side of each of the waveguide cavities 78, 80, and 82, 84 opposite the common electrode 92 is coated with an electrically conductive coating, as indicated at 100, 101, 102 and 103, to provide longitudinally continuous secondary electrodes opposite the common electrode 92 for all four of the waveguide cavities.

The entire exterior of the assembly of the two blocks is coated with the metallizing compound, as indicated by coating 110, which covers all outer surfaces of the four outer sides of the assembled blocks, except for the area occupied by feed holes, such as holes 112, 114, see FIG. 5. Two or more of these feed holes are provided in each block. The holes are centrally located between side edges of the blocks, and thus are aligned with the center of the continuous longitudinally extending common electrode 92 and the ceramic, nonconductive partitions 86, 88. Between the bottom of the feed hole 112 and the coated inner surfaces 100, 101 of the waveguide cavities, are formed a pair of internally coated connecting bores 118, 120, which extend from the inner end of feed hole 112 to the coated sides 100, 101 of cavities 78, 80. Each of the connecting bores is internally coated with the same electrically conductive material completely around its periphery, and each has both of its end portions thereof outwardly flared in order to avoid sharp angles in the configuration of the conductive coating thereof. Fixedly positioned within each feed hole 112 is the hot RF connecting electrode 124, having an inner disc portion 126 in electrical contact with and providing an hermetic seal with the outermost ends of both of the coated conductive bores 118, 120. A rod portion 128 of electrode 124 is integrally formed as part of the disc portion 126, extending outwardly from the disc portion for receiving a connecting wire (not shown) for connection to a radio frequency power source. The configuration of feed hole 114 and its connecting bores is the same as described for feed hole 112.

The above described arrangement of the feed holes and electrode connections within dielectric block 70 is identical to the similar structure of dielectric block 72, which also has a feed hole 112a (and similar feed hole 114a, not shown) carrying a fixedly connected hot RF electrode connection 124a, which in turn is electrically connected to conductive bores 118a, 120a, to thereby provide an electrical connection to the conductive sides 102, 103 of waveguide grooves 82, 84.

Just as in the arrangement of FIGS. 1 through 4, the assembly of FIGS. 5 through 7 is provided at both ends with an integral mirror mounting disc formed of disc halves 132, 134, (and similar disc halves, not shown, on the other end) upon which a mirror (not shown) may be mounted and sealed to seal the ends of the cluster of waveguide cavities.

In the arrangement of FIGS. 5 through 7, the brazing compound that fixedly connects and seals the dielectric blocks to each other is connected to the common electrode and to an external ground, whereas the coating on the opposite sides of the cavities of the cluster are connected to the power source by means of the conductive bores and electrode connecting element 124, 124a. In the arrangement of FIGS. 1 through 4, on the other hand, the parts are reversed in that the common electrode, common to all four of the waveguide cavities, lies in a plane perpendicular to the matting contiguous faces of the two dielectric blocks and forms the hot RF electrode, being connected to the radio frequency power supply, whereas the brazing compound that fixedly connects the two dielectric blocks to each other and is interposed between the contiguous faces of the blocks, connects to the electrically conductive exterior faces of the assembly of blocks, which in turn are ground (connected to the other side of the power supply).

Functionally the two configurations are identical, and all advantages of the configuration of FIGS. 1 through 4 are fully realized by the configuration of FIGS. 5 through 7. As in the earlier configuration, single flat mirrors mounted on each end of the waveguide cavity structures suffice to cooperate with all four of the cavities. Since the waveguide cavities are mutually parallel, alignment of the mirrors for all cavities is accomplished simultaneously by adjustment of the one mirror on each end. Again, although each of the waveguides is independent, thus resulting in small phase and frequency differences in the outputs, coupling between or among the several waveguides may be achieved to effectively provide a single frequency output.

In manufacture of the various structures, the dielectric blocks are ground to the illustrated configuration and then metallized. The thin partitions 36, 38 and common electrode 26 are inserted in the configuration of FIGS. 1 through 4, and the blocks are brazed together along the contiguous faces 14, 16. With the arrangement of FIGS. 5 through 7, the metallizing is carried out for the waveguide cavities, for holes 112, 112a, 114, 114a, the contiguous surfaces 74, 76 and the external surfaces except the semicircular end faces. The two dielectric blocks are then joined and brazed, with the electrode 92, connecting elements 124, 124a and mirror mounts inserted and secured in place. In both embodiments the mirrors are mounted on the ends of the assembly and the cavities filled with gas, such as carbon dioxide, for example.

Figure 8:
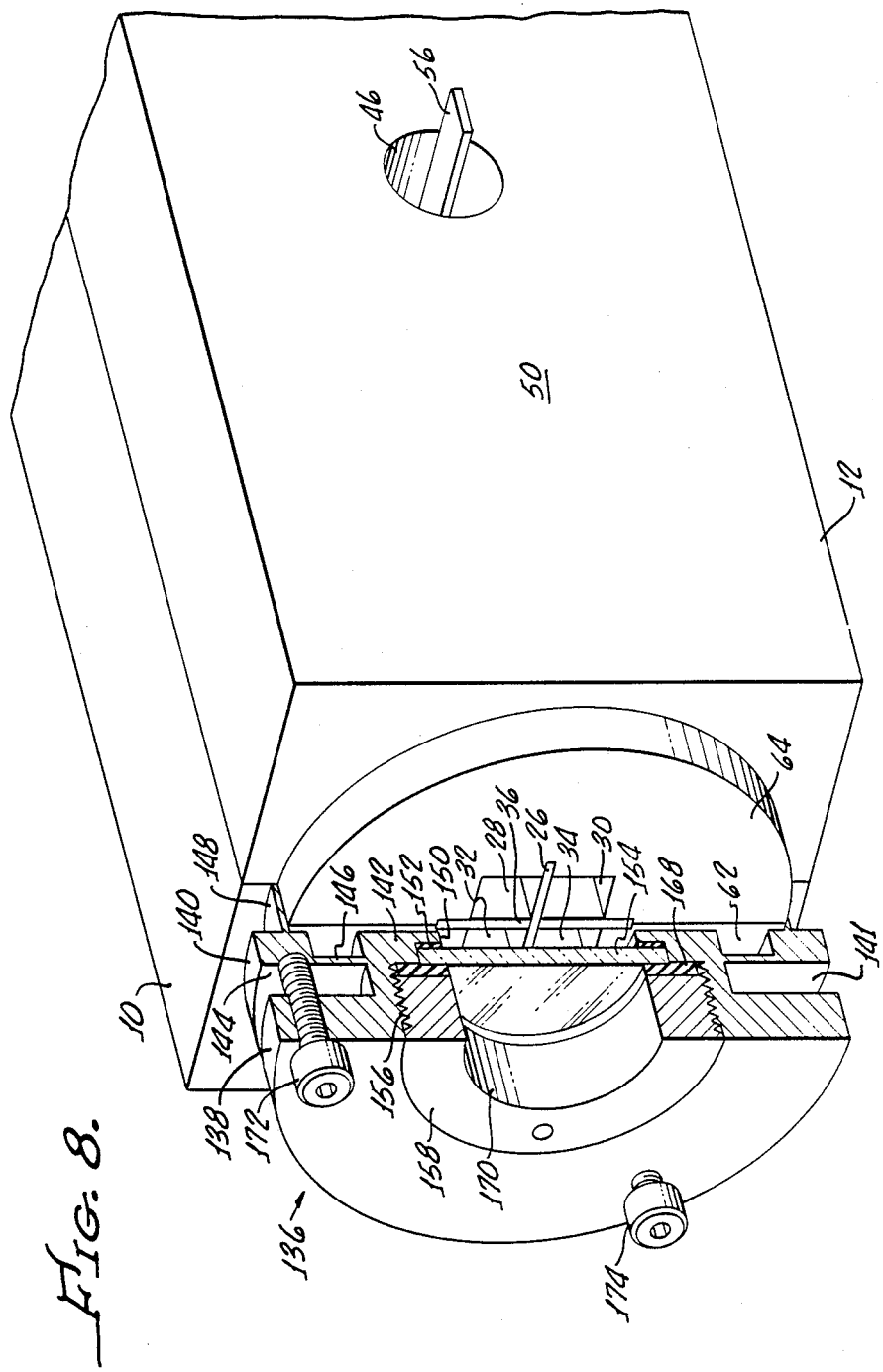
FIG. 8 is a pictorial view, with parts cut away, showing details of the end mirror mounting.

Illustrated in FIG. 8 is an exemplary mirror assembly applicable to the clustered waveguides of either of the embodiments shown above. The mirror assembly is specifically shown on one end of the clustered waveguides of FIGS. 1, 2, 3, and 4. First and second disc sections 138, 140 are integrally connected to one another by an inner hub section 142. The hub section is connected to the outer peripheral edge 144 of the disc section 140 by means of a thin, annular, relatively flexible connecting section 146. A continuous thin circular flange 148 projects outwardly axially from one face of the edge 144 and closely receives the outer surface of the disc halves 62, 64 to which it is secured by metallizing and brazing.

An aperture 150 in hub section 142 adjacent the outer surface of the disc halves 62, 64 is enlarged to receive a sealing washer 152 and the flat end mirror 154. A second enlargement of aperture 150 extends through disc section 138 and is internally threaded, as at 156, to receive a hollow holding screw 158 which is threaded in the enlarged aperture and bears against a load distribution washer 168 that is interposed between the inner end of the screw 158 and an outer annular portion of mirror 154. The screw 158 itself is apertured, as at 170, so that light from all four cavities can freely pass through the smallest bore of aperture 150 and through the screw 170. Mirror assembly 136 is formed effectively into first and second discs 138 and 140 by a deep annular slot 141 extending from the outer edges of discs 138, 140 radially inwardly to the disc hub section 142.

Three adjusting screws, of which only those indicated at 172 and 174 are illustrated, are spaced equally around the periphery of the assembly, threaded in the outer disc section 138, and bearing against the outer surface of the annular portion 144 of the inner disc section 140. Adjustment of one or more of the screws 172, 174 causes flexing of the thin connecting section 146 to adjust the plane of the mirror relative to the axis of the several waveguide cavities. As the mirror is spaced axially from the ends of the cavities, the cavities slightly interact with each other at the ends, although the several partitions seal the cavities from one another along their lengths. Gas is introduced to the cavities by means of a gas aperture (not shown) extending through the mirror mounting assembly on one end of the clustered cavities, or through a hole in one of the dielectric blocks. The gas aperture is in communication at one end with the interior of the cavities and at the other with a fitting connected to a suitable source of gas, typically having a volume considerably larger than the volume of the cavities. It will be understood that the mirror assembly at the other end of the block of clustered waveguide cavities is identical to that illustrated in FIG. 8, differing only in mirror transmissivity. Further, the identical mounting of mirror shown for the arrangement of FIGS. 1 through 4 may be employed for the embodiment of FIGS. 5, 6 and 7.

There have been described novel clustered waveguide laser systems having improved configurations of mutually parallel, closely spaced plural waveguide cavities, and improved more efficient arrangements for coupling radio frequency energy to the waveguide cavities. The use of relatively thin, substantially continuous electrodes, all positioned internally of the waveguide cavities, provides greatly increased efficiency in the application of the radio frequency exciting energy. The arrangement provides for a compact, small size laser, with relatively high output power capability. The clustering of a group of closely spaced waveguide cavities allows the use of small cross section cavities, thus favoring the ability to obtain single mode operation with concomitant narrow bandwith, and yet provide high power output.

The foregoing detailed description is to be clearly understood as given by way of illustration and example only, the spirit and scope of this invention being limited solely by the appended claims.

What is claimed is:

1. A multiple cavity waveguide laser comprising
first and second blocks of dielectric material having mutually contiguous faces sealed to one another,
first and second pairs of side by side waveguide grooves formed in said first and second blocks, respectively, each groove opening to a respective one of said faces,
first relatively thin partition means extending along and separating the grooves of each of said pairs of waveguide grooves from one another and forming a first side of each of said grooves,
second relatively thin partition means extending along and interposed between said first and second blocks and separating the grooves of said first pair from the grooves of said second pair and forming a second side of each of said waveguide grooves,
reflective means mounted at opposite ends of said grooves, said grooves, said partition means, and said reflective means defining a plurality of resonant cavities,
a lasing medium in said cavities,
one of said partition means being electrically conductive and forming a first electrode extending along one of said first and second sides of each of said grooves, and
means for coupling radio frequency electrical energy between said first electrode and a side of each of said waveguide grooves opposite said first electrode.

2. The laser of claim 1 wherein said grooves and partition means collectively form a cluster of closely spaced waveguide cavities each having two sides thereof defined by one of said dielectric blocks, one of said two sides of each waveguide cavity having an internal electrically conductive coating.

3. The laser of claim 1 wherein said first partition means is electrically conductive and forms said first electrode, and wherein said means for coupling radio frequency electrical energy comprises at least one hole extending through one of said blocks of dielectric material between an outside thereof and said first electrode and a conductive connector element in said hole and connected to said first electrode.

4. The laser of claim 1 including an electrically conductive connecting material covering at least a major portion of said contiguous faces for fixedly connecting and sealing said first and second blocks to one another, said means for coupling radio frequency electrical energy including said connecting material.

5. The laser of claim 1 wherein said mutually contiguous faces are coated with and sealed to one another by an electrically conductive brazing compound, said means for coupling radio frequency electrical energy including said brazing compound.

6. The laser of claim 1 wherein said mutually contiguous faces and outer faces of said first and second blocks of dielectric material are coated with an electrically conductive connecting material, said first partition means forming said first electrode, said means for coupling radio frequency electrical energy including said electrically conductive connecting material, said connecting material being in electrically conductive contact with sides of each of said waveguide grooves opposite said first partition means.

7. The laser of claim 1 wherein said first partition means comprises first and second thin strips of dielectric material extending along said grooves and separating one groove of each pair of grooves from the other, said second relatively thin partition means comprising a longitudinally extending strip of electrically conductive material forming a first longitudinally extending electrode, said first and second blocks having said mutually contiguous faces thereof coated with an electrically conductive connecting material, said conductive material being in electrically conductive contact with said second partition means, said means for supplying radio frequency electrical energy comprising a feed hole formed in each of said blocks opening to the side thereof opposite said contiguous faces, first and second conductive bores in each said block extending between said feed hole and respective ones of the grooves of one of said blocks, said conductive bores being internally coated with an electrically conductive bore material that is in electrically conductive contact with said first electrode, and a connector element mounted in the feed hole of each of said first and second blocks in electrically conductive contact with both of the conductive bores of such block, said means for coupling radio frequency electrical energy including said connecting element, and the electrically conductive connecting material on said mutually contiguous faces.

8. The laser of claim 1 wherein said first relatively thin partition means forms said first electrode, said second partition means having partitions extending beyond said waveguide grooves between said first and second blocks, said mutually contiguous faces of said first and second blocks and said portions of said second partition means extending beyond said waveguide grooves being coated with an electrically conductive connecting material, at least one of said blocks including a connector aperture extending from said first partition means to a side of said one block opposite said contiguous faces, an electrode tab positioned in said connector aperture and extending from said first electrode to the exterior of said one block, said means for coupling radio frequency electrical energy including said electrically conductive connecting material and said electrode.

9. A multiple cavity waveguide laser having a cluster of closely spaced but separate cavities comprising
first and second elongated dielectric blocks having first and second longitudinally extending partition receiving recesses opening to first and second mutually contiguous faces of said first and second blocks respectively, said first and second blocks having longitudinally extending first and second cavity recesses extending inwardly of the blocks from said partition receiving recesses,
an electrically conductive electrode coating on the surface of one side of each said cavity recess,
a common partition in said partition recesses closing one side of each said cavity recess,
said first dielectric block having a feed hole therein extending from a side opposite said mutually contiguous faces into the cavity recesses in said first dielectric block, an electrically conductive electrode tab mounted in said feed hole, means for coupling radio frequency energy between said electrode tab and the electrically conductive electrode coating on said cavity recess surfaces, a second common partition extending across and between said cavity recesses, one of said common partitions being electrically conductive and the other being electrically non-conductive, means for fixedly securing and sealing said dielectric blocks to one another along said contiguous faces thereof with said common partitions in said recesses, reflective means mounted at the ends of said recesses, said recesses, partitions and reflective means defining resonant cavities, and a laser medium in said cavities.

10. The laser of claim 9 wherein said means for fixedly securing and sealing said dielectric blocks comprises an electrically conductive connecting material formed on said mutually contiguous faces and in electrically conductive contact with said electrically conductive electrode coating of all of said cavity recesses.

11. The laser of claim 10 wherein said second common partition is electrically conductive and is electrically connected to said electrode tab in said feed hole.

12. The laser of claim 9 wherein said means for fixedly securing and sealing said dielectric blocks to one another along said contiguous faces thereof comprises an electrically conductive connecting material extending substantially along the entire area of said mutually contiguous faces, said first common partition comprising a thin strip of electrically conductive material in contact with said electrically conductive connecting material, said second dielectric block having a second feed hole therein, said means for coupling radio frequency energy including a second electrically conductive electrode tab mounted in said second feed hole and an electrically conductive coating on the surfaces of said feed holes extending between said electrically conductive electrode tab and the electrically conductive electrode coating on said cavity recess surfaces.

13. The laser of claim 9 including a mounting disc formed on one end of said blocks, a mirror disc secured and sealed to said mounting disc and having a mirror aperture extending therethrough, said aperture being aligned with said cavity recesses and having an area not less than the combined cross sectional area of all of said cavity recesses, and a mirror mounted in and sealed to said aperture.

14. The laser of claim 13 wherein said mirror disc includes means for adjusting the orientation of the plane of said mirror relative to the longitudinal extent of said cavity recesses.

* * * * *